United States Patent
Stech

(10) Patent No.: US 6,203,050 B1
(45) Date of Patent: Mar. 20, 2001

(54) BALL HITCH WITH LOCK ASSEMBLY

(75) Inventor: Clyde G. Stech, Orlando, FL (US)

(73) Assignee: B.C. Cure, Inc., Apopka, FL (US)

( * ) Notice: Subject to any disclaimer, the term of this patent is extended or adjusted under 35 U.S.C. 154(b) by 0 days.

(21) Appl. No.: 09/304,524

(22) Filed: May 4, 1999

Related U.S. Application Data

(63) Continuation-in-part of application No. 29/085,870, filed on Mar. 31, 1998.

(51) Int. Cl.$^7$ .................................................. B60D 1/173
(52) U.S. Cl. ............................................. 280/507; 280/511
(58) Field of Search .................................. 280/507, 511, 280/512, 513, 514, 515

(56) References Cited

U.S. PATENT DOCUMENTS

| | | |
|---|---|---|
| 438,824 | 10/1890 | Price . |
| 3,393,924 | 7/1968 | Silver .................................. 280/461 |
| 3,790,192 | 2/1974 | Green .................................. 280/507 |
| 4,542,914 | 9/1985 | Shropshire ........................... 280/507 |
| 5,044,652 | 9/1991 | Brisson .............................. 280/416.1 |
| 5,104,138 * | 4/1992 | Allen .................................... 280/433 |
| 5,143,393 * | 9/1992 | Meyer ................................ 280/491.1 |
| 5,280,941 * | 1/1994 | Guhlin ................................. 280/507 |
| 5,284,038 * | 2/1994 | Johnson ................................ 70/232 |
| 5,297,407 * | 3/1994 | Tarr ....................................... 70/232 |
| 5,379,618 | 1/1995 | Shieh ...................................... 70/33 |
| 5,395,131 * | 3/1995 | Herrick ................................. 280/507 |
| 5,442,941 | 8/1995 | Kahonen ................................. 70/34 |

FOREIGN PATENT DOCUMENTS 2195 967   4/1988   (GB) .............................. B60D/1/06

* cited by examiner

*Primary Examiner*—Kevin Hurley
*Assistant Examiner*—Andrew J. Fischer
(74) *Attorney, Agent, or Firm*—Taylor & Aust, P.C.

(57) ABSTRACT

A ball hitch and lock assembly is described in which a hitch ball member is connected to the top of a threaded shaft or bolt, the lower end of which is received into a notch of a locking mechanism. A removable locking pin within the locking mechanism extends from one side of the notch, through a bore in the shaft, and into the other side of the notch. The lower end of the shaft received within the notch includes two opposed flats, with each flat being disposed at a respective one of the two opposing ends of the shaft bore. The flats are separated by a distance less than the diameter of the shaft enabling the lower end of the shaft to be snugly received within the notch such that each of the flats interfaces with a respective side of the notch. The shaft threads above the flats extend beyond the width of the notch to prevent the introduction of a cutting instrument for the locking pin.

12 Claims, 2 Drawing Sheets

BALL HITCH WITH LOCK ASSEMBLY

CROSS REFERENCE TO RELATED APPLICATIONS

This is a continuation-in-part co-pending U.S. Design patent application Ser. No. 29/085,870 filed Mar. 31, 1998.

BACKGROUND OF THE INVENTION

1. Field of the Invention

The present invention relates to hitch balls for use with trailer hitches and, more specifically to hitch balls having lock assemblies.

2. Description of the Related Art

What are known as ball type hitches are now commonly used for the towing of various types of vehicles, trailers and the like (collectively "vehicle"). Such ball type hitches are usually mounted onto the rear of a towing vehicle via a plate. A mating socket type device is then mounted onto the front of the towed vehicle. When it is desired to tow the vehicle, the socket device is received onto the ball hitch.

The ball hitch usually includes a bolt onto which is coupled a spherical ball member. The bolt extends through a hole in the plate and is secured onto the plate by a nut.

However, the conventional ball hitches can be easily removed from the towing vehicle, and this is not desirable. In view of this, various ball hitches have been developed that are capable of being locked in order to deter or attempt to prevent removal. Unfortunately, even the prior art lockable ball type hitches can be removed by cutting the locks in some manner.

It is thus desirable to have a ball type hitch that is difficult to remove in any manner.

It is also desirable to have a ball type hitch that is lockable.

SUMMARY OF THE INVENTION

In keeping with the above, the present invention is a hitch ball and lock assembly. In one form, a ball member is connected to the top of a threaded shaft or bolt, the lower end of which is received within a notch of a lock mechanism. A locking pin within the lock mechanism extends from one side of the notch, through a bore in the shaft and into the other side of the notch. The shaft also has two opposing flat surfaces each of which coacts with a respective side of the notch.

The locking pin may include a key lock mechanism that retains the pin, but allows the removal thereof from the shaft bore. This allows the ball member and associated bolt to be removed from the notch. In a preferred embodiment, the shaft bore intersects the opposing flat surfaces. The lock mechanism also allows the ball and shaft to rotate thereabout or pivot about the pin in an arc of greater than 180°.

In one form thereof, the flat surfaces are separated by a distance less than the diameter of the shaft, enabling the lower end of the shaft to be snugly received within the notch such that each flat surface interfaces with a respective side of the notch. In this manner, the round portion or threads of the shaft above the flat surfaces blocks the insertion of a cutting device between either one of the flat surfaces and the sides defining the notch, thereby preventing the locking pin from being cut.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates a preferred embodiment of the invention, in one form, and such exemplification is not to be construed as limiting the scope of the invention in any manner.

DETAILED DESCRIPTION OF THE INVENTION

Figure 1:
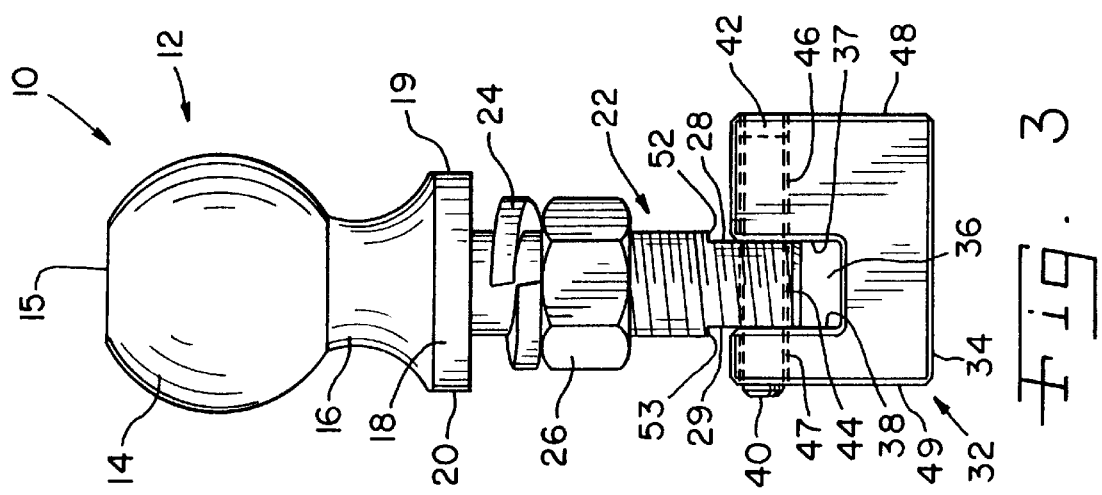
FIG. 1 is a perspective view of an embodiment of the present hitch ball and lock assembly.

With reference to the Figures, there is shown an embodiment of the present ball hitch and lock assembly, generally designated 10. Ball hitch and lock assembly 10 includes a ball member 12, a threaded shaft or bolt 22 and a lock assembly 32.

Ball member 12 has a ball portion 14 with a flat top surface 15, a neck portion 16, and a skirt 18. Preferably, ball portion 14, neck portion 16 and skirt 18 are formed as one piece from a suitable metal as currently known in the ball hitch art. Two diametrically opposed wrench flats 19 and 20 are formed on or cut into the periphery of skirt 18. Ball member 12 is rigidly affixed to threaded shaft 22. For example, ball member 12 may have an internally threaded bore (not shown) for threaded receipt of one or an upper end of threaded shaft 22. Disposed on threaded shaft 22 is a lock washer 24 and a nut 26. Both lock washer 24 and nut 26 are sized to be received on threaded shaft 22 and are used in securely attaching ball hitch and lock assembly 10 to a vehicle or the like (not shown).

Figure 2:
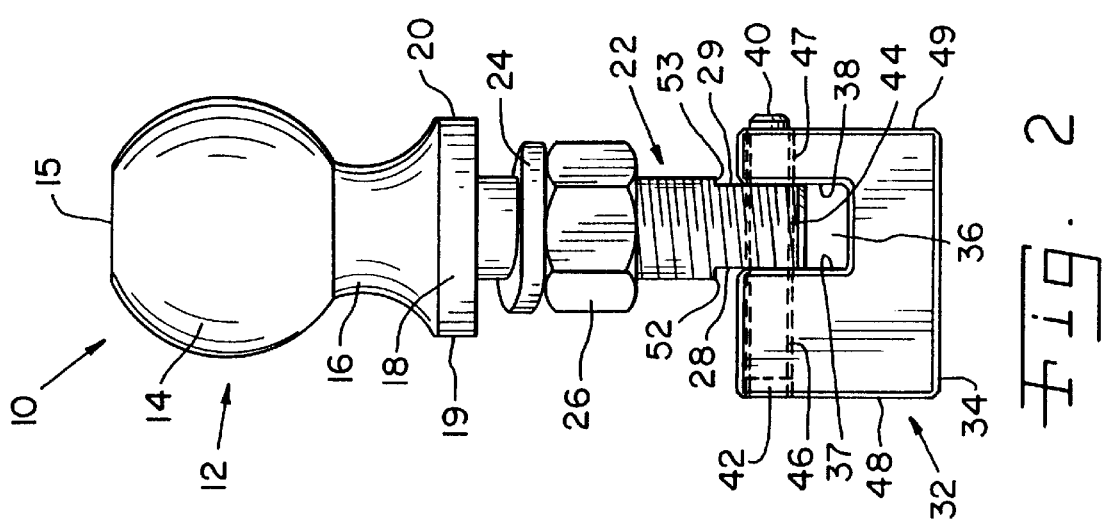
FIG. 2 is a front elevation view of the present hitch ball and lock assembly.
Figure 3:
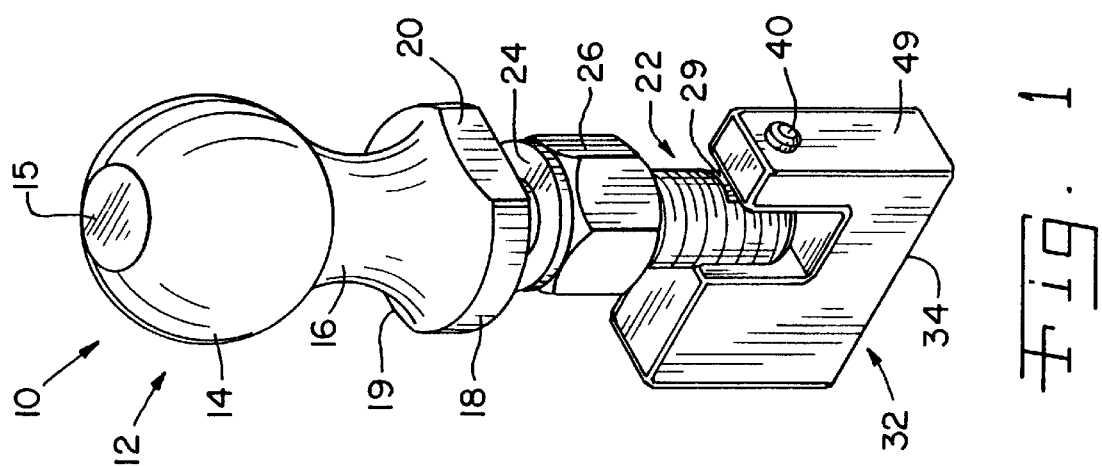
FIG. 3 is a rear elevation view of the present hitch ball and lock assembly.
Figure 4:
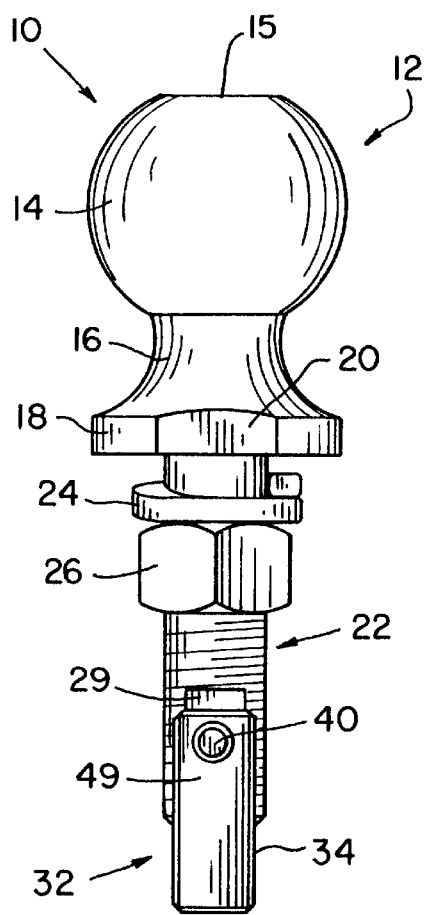
FIG. 4 is a right side elevation view relative to FIG. 1 of the present hitch ball and lock assembly.

On another or lower end of threaded shaft 22 opposite ball member 12 is a first flat surface 28 and a second flat surface 29. Flat surfaces 28 and 29 are separated by a distance less than the diameter of threaded shaft 29 and are preferably diametrically opposed. With particular reference to FIGS. 2 and 3, threaded shaft 22 further includes a shaft bore 44 disposed transverse to the longitudinal axis of threaded shaft 22 that extends from one flat surface 28 to the other flat surface 29.

Lock or padlock assembly 32 is defined by a base portion 34 having a notch or cutout 36 on one side. Notch 36 has side walls 37 and 38 and is sized to snugly accommodate the lower end of threaded shaft 22 such that flat surfaces 28 and 29 are closely adjacent or abutting respective side walls 37 and 38. Notch 36 has a depth that allows flat surfaces 28 and 29 to be fully received therein. Base portion 34 includes a first bore or shaft 46 that extends from an outside end wall 48 to side wall 37 and a second bore or shaft 47 that extends from an outside end wall 49 to side wall 38. First and second bores 46 and 47 are coaxial. A locking pin 40 is disposed within first and second bores 47 and 48 and extends through shaft bore 29 to pivotally retain threaded shaft 22 and ball assembly 12.

Flat surfaces 28 and 29 define respective ledges or overhangs 52 and 53 that are the threads of shaft 22. Notch 36 is of a width such that ledges 52 and 53 extend beyond that width. Thus, because of the snug fit of the lower end of threaded shaft 22 into notch 36 and the ledges 52 and 53 that extend beyond the width of notch 36, a cutting instrument such as a hack saw or bolt cutters is prevented from being inserted between flat surfaces 28 and 29 and the respectively abutting side walls 37 and 38. Locking pin 40 thus cannot be severed with the use of a cutting instrument.

Figure 5:
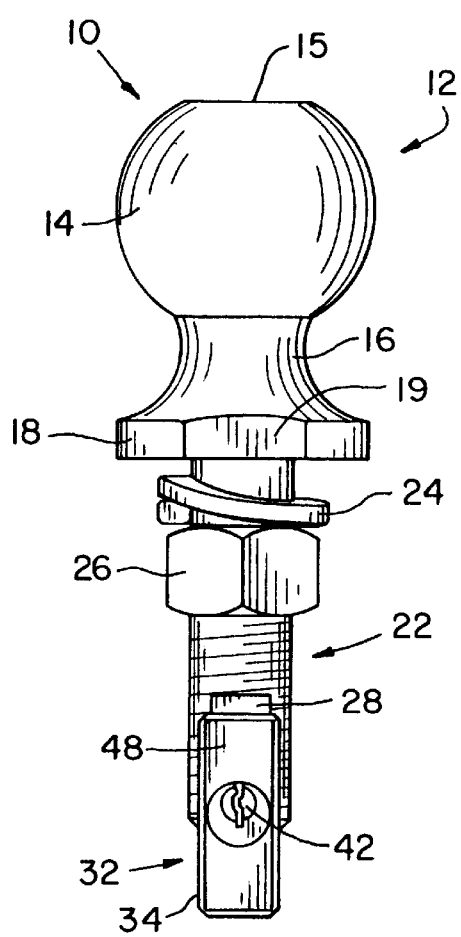
FIG. 5 is a left side elevation view relative to FIG. 1 of the present hitch ball and lock assembly.
Figure 6:
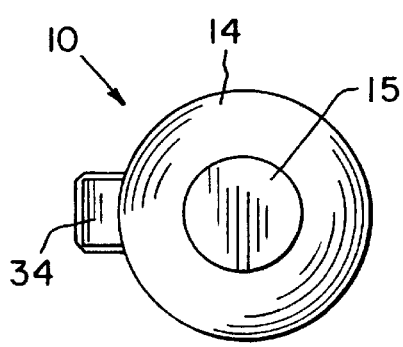
FIG. 6 is a top plan view of the present hitch ball and lock assembly.
Figure 7:
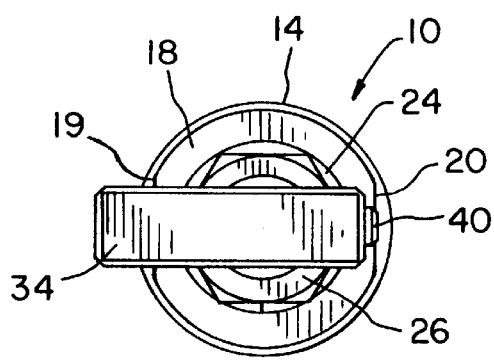
FIG. 7 is a bottom plan view of the present hitch ball and lock assembly.

With particular reference to FIG. 5, there is shown a keylock assembly 42 on outside end wall 48 that locks and unlocks locking pin 40. In a locked position, locking pin 40 cannot be removed from bores 44, 46 and 47 and thus retains threaded shaft 22 within notch 36. In an unlocked position, locking pin 40 can axially slide within bores 46, 44 and 47 and be completely removed from shaft bore 44. This thus allows threaded shaft 22 to be removed from notch 36. Preferably, while locking pin 40 clears bores 44 and 46, a stop mechanism (not shown) on pin 40 or internal to padlock assembly 32 prevents locking pin 40 from being completely removed from bore 47.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A ball hitch assembly comprising:

a ball portion;

a lock assembly having first and second end walls and a notch defining first and second side walls and having a notch width, said lock assembly including a first pin bore extending from said first end wall to said first side wall, a second pin bore extending from said second end wall to said second side wall, and a pin axially movably disposed within said first and second pin bores; and a threaded shaft coupled at a first end to said ball portion, said threaded shaft having opposing first and second flat surfaces at a second end thereof defining first and second ledges wherein threads of said threaded shaft at said first and second ledges define a thread width that is greater than said notch width, and a shaft bore extending from said first and second flat surfaces, said first and second flat surfaces defining a shaft width less than said notch width and adapted to be received within said notch, said shaft bore adapted to be coaxial with said first and second pin bores when said second end is received in said notch, said pin being axially movably disposed within said shaft bore to removably retain said threaded shaft within said notch.

2. The ball hitch assembly of claim 1, wherein said lock assembly is a padlock.

3. The ball hitch assembly of claim 1, wherein said pin is selectively lockable to prevent axial movement thereof within said bores.

4. The ball hitch assembly of claim 3, wherein said pin is prevented from removal from one of said first and second pin bores.

5. The ball hitch assembly of claim 1, further comprising a key lock device that selectively allows axial movement of said pin within said bores.

6. A ball hitch assembly comprising:

a ball member;

a lock having first and second end walls and a notch defining first and second side walls and having a notch width, said lock including a first pin bore extending from said first end wall to said first side wall, and a second pin bore extending from said second end wall to said second side wall;

a threaded bolt coupled at a first end to said ball member, said threaded bolt having diametrically opposing first and second flat surfaces at a second end thereof radially inward of the threads such that said threads define first and second overhangs, said threads at said first and second overhangs having a thread width greater than said notch width, and a shaft bore extending from said first flat surface to said second flat surface, said first and second flat surfaces defining a shaft width less than said notch width and adapted to be received within said notch, said shaft bore adapted to be coaxial with said first and second pin bores, said first flat surface adapted to abut said first side wall, and said second flat surface adapted to abut said second side wall when said second end is received in said notch; and a pin axially movably disposed within one of said first and second pin bores and extendable through said notch, said shaft bore and another of said first and second pin bores when said second end of said bolt is received within said notch to removably retain said bolt therein.

7. The ball hitch assembly of claim 6, wherein said lock is a padlock.

8. The ball hitch assembly of claim 6, wherein said pin is selectively lockable when extending through said first and second pin bores and said shaft bore to prevent axial movement thereof within said bores.

9. The ball hitch assembly of claim 8, wherein said pin is prevented from complete removal from one of said first and second pin bores.

10. The ball hitch assembly of claim 6, further comprising a key lock device that selectively prevents axial movement of said pin within said bores.

11. The ball hitch assembly of claim 6, wherein said lock has an unlocked position and a locked position, said unlocked position allowing axial movement of said pin, and said locked position prevents axial movement of said pin.

12. The ball hitch assembly of claim 11, wherein when in said locked position, said pin extends through said first pin bore, said notch, and said second pin bore.

* * * * *